United States Patent [19]

Kanda

[11] Patent Number: 5,060,918
[45] Date of Patent: Oct. 29, 1991

[54] FLUID-FILLED CYLINDRICAL ELASTIC CONNECTOR HAVING TWO ORIFICE PASSAGES WITH DIFFERENT CROSS SECTIONAL AREAS

[75] Inventor: Ryouji Kanda, Komaki, Japan

[73] Assignee: Tokai Rubber Industries, Ltd., Aichi, Japan

[21] Appl. No.: 495,752

[22] Filed: Mar. 19, 1990

[30] Foreign Application Priority Data

Mar. 23, 1989 [JP] Japan .................................. 1-33001

[51] Int. Cl.⁵ ............................................ F16F 13/00
[52] U.S. Cl. .................................. 267/140.1; 180/312;
248/562; 248/636; 267/219
[58] Field of Search ................ 267/140.1 C, 140.1 R,
267/219, 220; 180/300, 312, 902; 248/562, 636, 638

[56] References Cited

U.S. PATENT DOCUMENTS

| | | |
|---|---|---|
| 4,479,638 | 10/1984 | Wolf et al. |
| 4,588,174 | 5/1986 | Konishi ........................ 267/140.1 C |
| 4,720,087 | 1/1988 | Duclos et al. .................. 267/219 X |
| 4,763,884 | 8/1988 | Matsui et al. ................. 267/140.1 C |
| 4,884,789 | 12/1989 | Takeda et al. ................. 267/219 X |
| 4,893,797 | 1/1990 | Le Fol et al. ................. 267/140.1 A |

FOREIGN PATENT DOCUMENTS

| | | |
|---|---|---|
| 71698 | 2/1983 | European Pat. Off. ...... 267/140.1 C |
| 48-36151 | 11/1973 | Japan . |
| 52-16554 | 5/1977 | Japan . |
| 37349 | 2/1984 | Japan .................................. 267/219 |
| 270533 | 5/1985 | Japan . |
| 62-88834 | 4/1987 | Japan . |
| 62-118133 | 5/1987 | Japan . |
| 62-124333 | 6/1987 | Japan . |
| 224745 | 10/1987 | Japan .......................... 267/140.1 C |
| 3722079 | 1/1988 | Japan .................................. 267/219 |
| 63-172035 | 7/1988 | Japan . |

Primary Examiner—George E. A. Halvosa
Attorney, Agent, or Firm—Oliff & Berridge

[57] ABSTRACT

A fluid-filled cylindrical elastic connector having an inner sleeve, an outer sleeve, and an elastic body between the two sleeves. The elastic connector has a main fluid chamber and a first and a second auxiliary fluid chamber, which are formed between the inner and outer sleeves such that the first and second auxiliary fluid chambers are disposed diametrically opposite to the main fluid chamber with respect to the inner sleeve, and such that the first and second auxiliary fluid chambers are spaced from each other in an axial direction of the inner sleeve. The main, first auxiliary, and second auxiliary fluid chambers are filled with a non-compressible fluid. Upon application of a vibrational load, relative pressure changes occur between the main fluid chamber and the first and second auxiliary fluid chambers. The elastic mount further has a first orifice passage having a first cross sectional area and communicating with the main fluid chamber and the first auxiliary fluid chamber, so as to allow restricted fluid flows therebetween, and a second orifice passage having a second cross sectional area which is larger than the first cross sectional area, and communicating with the main fluid chamber and the second auxiliary fluid chamber, so as to allow restricted fluid flows therebetween.

8 Claims, 6 Drawing Sheets

FLUID-FILLED CYLINDRICAL ELASTIC CONNECTOR HAVING TWO ORIFICE PASSAGES WITH DIFFERENT CROSS SECTIONAL AREAS

BACKGROUND OF THE INVENTION

1. Field of the Invention

The present invention relates in general to a fluid-filled cylindrical elastic connector capable of reducing the amount of transmission of vibrations, based on flows of a fluid contained therein. More particularly, the invention is concerned with such a fluid-filled cylindrical elastic connector which is capable of effectively damping input vibrations having relatively low frequencies, and exhibiting a sufficiently low dynamic spring constant with respect to input vibrations having high frequencies.

2. Discussion of the Prior Art

There is known a cylindrical elastic connector such as a suspension bushing or engine mount used on a motor vehicle, which is interposed between two members in a vibration transmitting system for elastically or flexibly connecting these members in a vibration damping or isolating manner. Such a cylindrical elastic connector has an inner and an outer sleeve which are made of a metallic material and are disposed in radially spaced-apart relationship with each other. Between these inner and outer sleeves, there is interposed an elastic body such as a formed rubber mass, such that the two sleeves are elastically connected by the elastic body.

The elastic connector of the type indicated above is generally required to provide an excellent vibration damping effect with respect to low-frequency vibrations, and exhibit a sufficiently low dynamic spring rate or constant with respect to high-frequency vibrations. Conventionally, the elasticity or elastic deformation of the elastic body is primarily relied upon to meet these two requirements concerning the vibration damping and/or isolating characteristics. However, the conventional elastic connector suffers from considerable difficulty in meeting the requirements, particularly the requirement for providing a satisfactory effect of damping the low-frequency vibrations.

In view of the above drawback of the conventional cylindrical elastic connector, a so-called fluid-filled connector has been recently proposed, as disclosed in Publication Nos. 48-36151 and 52-16544 of examined Japanese Patent Applications. A fluid-filled cylindrical elastic connecter as disclosed in these publications has two fluid chambers which are partially defined by an elastic body and are filled with a suitable non-compressible fluid. The two fluid chambers are held in fluid communication with each other through a suitable orifice passage, so that the input vibrations having relatively low frequencies may be effectively damped by resonance of a fluid flowing through the orifice passage. The fluid flow is induced by relative pressure changes between the two fluid chambers due to elastic deformation of the elastic body upon application of the vibrations to the fluid-filled elastic connector.

In the fluid-filled elastic connector indicated above, the orifice passage for causing the fluid resonance is tuned so as to provide excellent damping characteristic for the vibrations having relatively low frequencies. However, the elastic connector also receives vibrations whose frequencies are higher than those of the excellently damped vibrations. When the frequency range of the vibrations received by the elastic connector is higher than the tuned frequency range of the orifice passage, substantially no flows of the fluid through the orifice passage occurs, or the orifice passage acts as if it were closed. In this case, therefore, the fluid-filled elastic connector exhibits a considerably high dynamic spring constant, and tends to undesirably suffer from deteriorated characteristics for isolating the high-frequency vibrations.

SUMMARY OF THE INVENTION

The present invention was developed in the light of the problems encountered in the prior art as addressed above. It is therefore an object of the present invention to provide a fluid-filled cylindrical elastic connector capable of exhibiting an effectively lowered dynamic spring constant with respect to input vibrations in a relatively high frequency range, while assuring a high damping effect with respect to input vibrations in a relatively low frequency range.

The above object of the present invention may be achieved according to the principle of the present invention, which provides a fluid-filled cylindrical elastic connector for flexibly connecting two members, comprising (a) an inner sleeve attached to one of the two members to be flexibly connected; (b) an outer sleeve attached to the other of the two members, and disposed radially outwardly of the inner sleeve with a predetermined radial spacing therebetween; (c) a generally annular elastic body interposed between the inner and outer sleeves for elastically connecting the inner and outer sleeves; (d) means for defining a main fluid chamber formed between the inner and outer sleeves so as to extend over a predetermined circumferential length of the elastic body, the main fluid chamber being filled with a non-compressible fluid; (e) means for defining a first and a second auxiliary fluid chamber formed between the inner and outer sleeves, such that the first and second auxiliary fluid chambers are disposed diametrically opposite to the main fluid chamber with respect to the inner sleeve, and such that the first and second auxiliary fluid chambers are spaced from each other by a predetermined distance in an axial direction of the inner sleeve, the first and second auxiliary fluid chambers being filled with the non-compressible fluid, relative pressure changes occuring between the main fluid chamber and the first and second auxiliary fluid chambers when a vibrational load is applied between the inner and outer sleeves; (f) means for defining a first orifice passage having a first cross sectional area and communicating with the main fluid chamber and the first auxiliary fluid chamber, so as to allow retricted fluid flows therebetween; and (g) means for defining a second orifice passage having a second cross sectional area which is larger than the first cross sectional area, and communicating with the main fluid chamber and the second auxiliary fluid chamber, so as to allow restricted fluid flows therebetween.

The fluid-filled cylindrical elastic connector of the present invention constructed as described above provides a high damping effect with respect to low-frequency vibrations, based on the resonance of the fluid mass flowing through the first orifice passage. While the first orifice passage does not effectively function to isolate high-frequency vibrations, the present elastic connector is able to prevent its dynamic spring constant from being undesirably increased in the presence of the second orifice passage. That is, the present connector exhibits a sufficiently low dynamic spring constant with respect to high-frequency vibrations, based on the resonance of the fluid flowing through the second orifice passage. Thus, the present connector exhibits excellent damping and isolating characteristics for a wide range of frequency of the input vibrations.

In one form of the invention, the elastic body has a first pocket corresponding to the main fluid chamber, and a second and a third pocket corresponding to the first and second auxiliary fluid chambers. The first, second and third pockets are closed by the outer sleeve, whereby the main fluid chamber and the first and second auxiliary fluid chambers are defined by the elastic body and the outer sleeve.

According to one feature of the above form of the invention, the elastic connector further comprises an intermediate sleeve disposed between the outer sleeve and the elastic body and secured to the elastic body, the intermediate sleeve having a first, a second, and a third window which are aligned with the first, second and third pockets, respectively. In this case, the intermediate sleeve may have a first pair of recesses corresponding to a first pair of arcuate grooves which are formed in the elastic body and which are closed by the outer sleeve to thereby provide the first orifice passage, and a second pair of recesses corresponding to a second pair of arcuate grooves which are formed in the elastic body and which are closed by the outer sleeve to thereby provide the second orifice passage.

In another form of the invention, the elastic connector further comprises at least one stop accommodated in at least one of the main, first auxiliary, and second auxiliary chambers, for limiting an amount of relative displacement of the inner and outer sleeves in the radial directions thereof.

According to one feature of the above form of the invention, the elastic body has three stopper portions as the above-indicated at least one stop, the three stopper portions protruding into the main fluid chamber, the continuously open first auxiliary fluid chamber and the second auxiliary fluid chamber, respectively.

According to another feature of the above form of the invention, the above-indicated at least one stop comprises a rigid stop member fitted on the inner sleeve and having two protrusions which protrude into the main fluid chamber and the first auxiliary fluid chamber, the rigid stop member and the inner sleeve defining the first orifice passage. In this case, the elastic body may have a pair of parallel holes formed therethrough so as to communicate with the main fluid chamber and the second auxiliary fluid chamber, thereby serving as the second orifice passage.

BRIEF DESCRIPTION OF THE DRAWINGS

The above and optional objects, features and advantages of the present invention will be better understood by reading the following detailed description of presently preferred embodiments, when considered in connection with the accompanying drawings, in which.

DETAILED DESCRIPTION OF THE PREFERRED EMBODIMENTS

Referring first to FIGS. 1-5, there is shown the presently preferred embodiment of the fluid-filled cylindrical elastic connector of the present invention, in the form of a suspension bushing 10 for a motor vehicle. In these figures, reference numeral 12 denotes an inner sleeve made of a metallic material and having a relatively large cylindrical wall thickness. Radially outwardly of the inner sleeve 12, there is disposed a metallic sleeve 14 as an intermediate sleeve also made of a metallic material and having a relatively small cylindrical wall thickness, such that these sleeves 12, 14 are radially spaced from each other by a predetermined distance.

Figure 6:
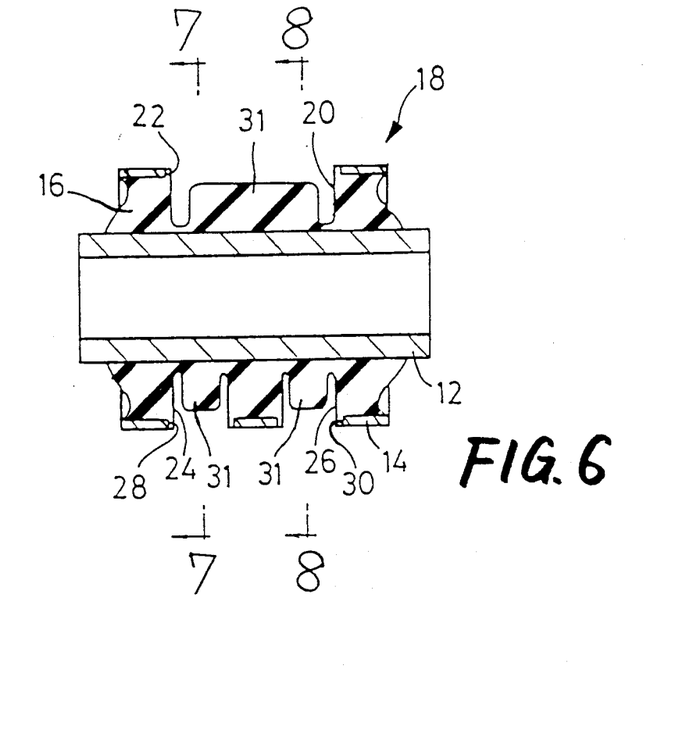
FIG. 6 is a cross sectional view corresponding to that of FIG. 1, showing an inner assembly or an intermediate product prepared by vulcanization of an elastic rubber body with an inner sleeve and a metallic sleeve, during manufacture of the suspension bushing.
Figure 7:
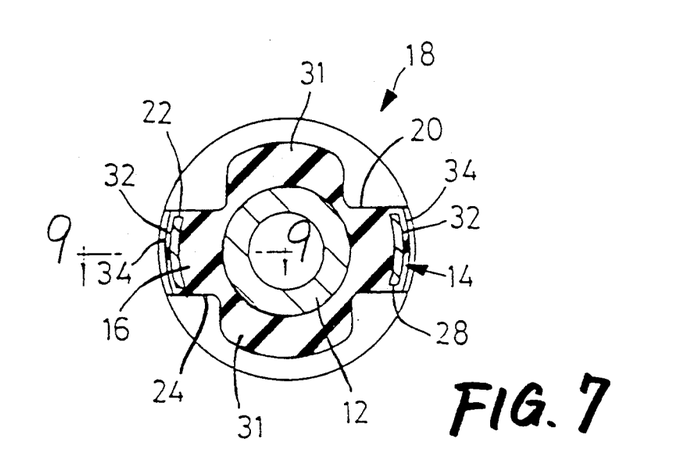
FIGS. 7 and 8 are elevational views in transverse cross section, taken along lines 7—7 and 8—8 of FIG. 6, respectively.
Figure 8:
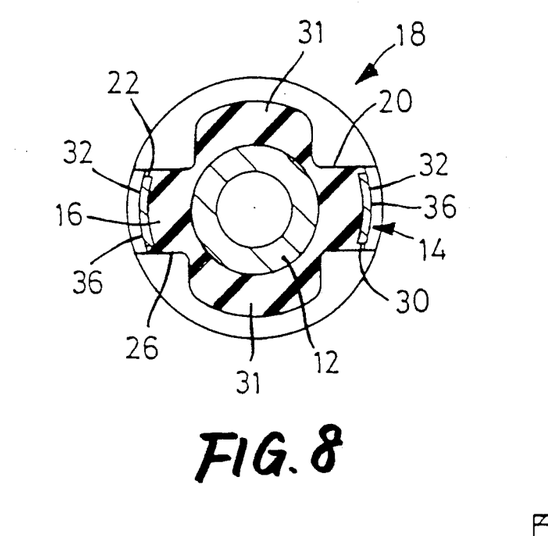

Between the inner sleeve 12 and the metallic sleeve 14, there is interposed a generally cylindrical elastic body 16, such that the two sleeves 12, 14 are elastically connected to each other by the elastic body 16, as shown in FIGS. 6-9. The elastic body 16 is a generally annular member formed of a suitable rubber material. More specifically, the inner circumferential surface of the elastic body 16 is secured by vulcanization to the outer circumferential surface of the inner sleeve 12, while the outer circumferential surface of the elastic body 16 is secured by vulcanization to the inner circumferential surface of the metallic sleeve 14. In this manner, an inner assembly 18 consisting of the elastic body 16 and the two sleeves 12, 14 is obtained as an intermediate product as shown in FIG. 6.

The elastic body 16 has a first pocket 20 formed in its axially intermediate portion so as to extend over a little less than a half of the circumference thereof, such that the pocket 20 is aligned with one of diametrically opposite portions of the inner sleeve 12. The metallic sleeve 14 has a first window 22 aligned with the opening of the first pocket 20 formed in the elastic body 16, so that the pocket 20 is open on the outer circumferential surface of the inner assembly 18 of FIG. 6, through the first window 22. The elastic body 16 also has a second and a third pocket 24, 26, which are formed in alignment with the other of the above-indicated diametrically opposite portions of the inner sleeve 12 remote from the first pocket 28, such that the second and third pockets 24, 26 are spaced by a suitable distance from each other in the axial direction of the inner assembly 18. Each of the second and third pocket 24, 26 extends over a little less than a half of the circumference of the elastic body 16. The metallic sleeve 14 further has a second and a third window 28, 30, which are aligned with the openings of the second and third pockets 24, 26, respectively, so that these pockets 24, 26 are open on the outer circumferential surface of the inner assembly 18 of FIG. 6, through the second and third windows 28, 30, respectively.

Each of the first, second and third pockets 20, 24, 26 accommodates therein a stopper portion 31 formed integrally with the elastic body 16 and having an arcuate radial end face. Each stopper portion 31 protrudes by a predetermined distance from the central portion of the elastic body 16 toward the opening of the pocket 20, 24, 26, in the radial direction of the inner sleeve 12.

The metallic sleeve 14 has a pair of groove-like recesses 32 extending in its circumferential direction between the opposite circumferential ends of the first window 22 and the corresponding circumferential ends of the second window 28, and another pair of groove-like recesses 32 extending in the circumferential direction between the opposite circumferential ends of the first window 22 and the corresponding circumferential ends of the third window 30. Each of the recesses 32 is filled with a mass of the rubber material of the elastic body 16, during a vulcanization process in which the elastic body 16 is secured to the inner sleeve 12 and the metallic sleeve 14. The recesses 32 between the first and second pockets 20, 24 and the recesses 32 between the first and third pockets 20, 26 are partially filled with a rubber material of the elastic body 16. That is, the elastic body 16 has a pair of first arcuate grooves 34 formed in its portions located within the recesses 32 between the first and second pockets 20, 24, and a pair of second arcuate grooves 36 formed in its portions located within the recesses 32 between the first and third pockets 20, 26. Hence, the first pocket 20 is held in communication with the second and third pockets 24, 26, through the first and second arcuate grooves 34, 36, respectively.

Figure 9:
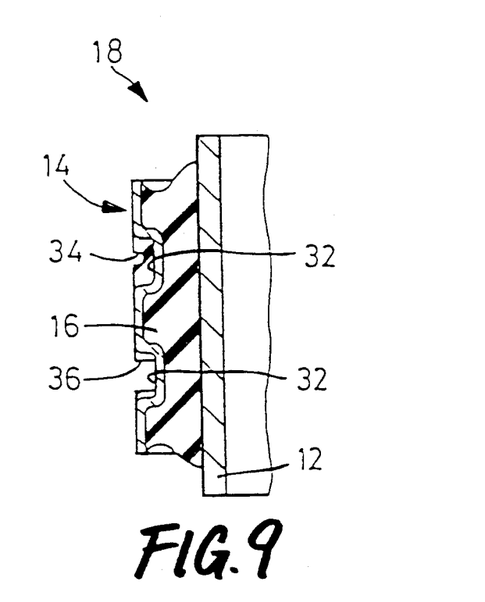
FIG. 9 is an elevational view in axial cross section, taken along line 9—9 of FIG. 7.

The first and second arcuate grooves 34, 36 have different cross sectional areas, as shown in FIG. 9. In the instant embodiment, the first arcuate grooves 34 have a cross sectional area or fluid flow area, which is smaller than that of the second arcuate grooves 36.

Figure 10:
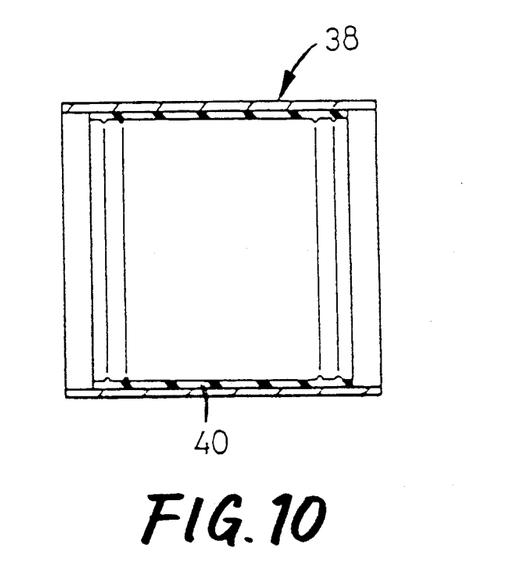
FIG. 10 is an axial cross sectional view of an outer sleeve of the suspension bushing of FIG. 1.
Figure 11:
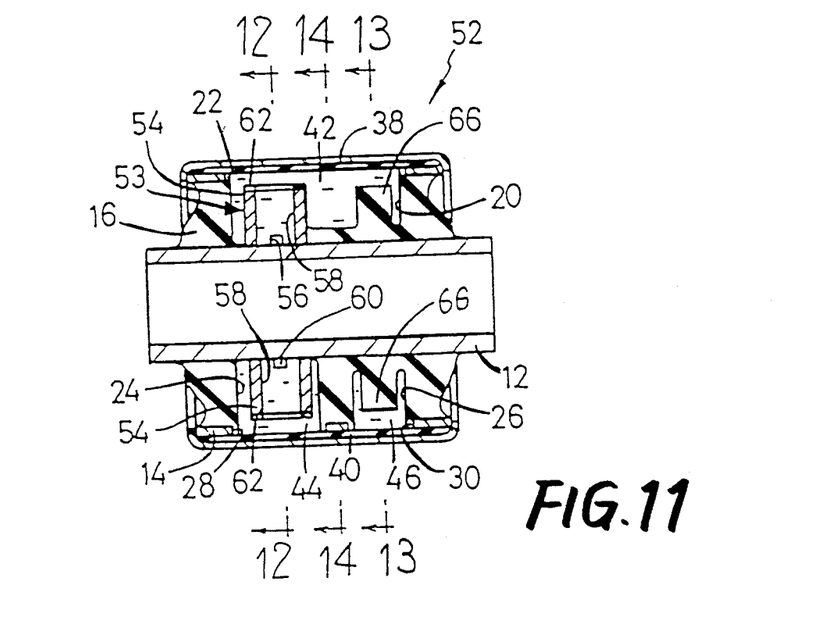
FIG. 11 is an elevational view in axial cross section, showing a suspension bushing according to another embodiment of the present invention.

The thus constructed inner assembly 18 of FIG. 6 consisting of the inner and intermediate metallic sleeves 12, 14 and the elastic body 16 is radially inwardly compressed as needed. After a suitable degree of preliminary compression is given to the inner assembly 18, an outer sleeve 38 is placed on the inner assembly 18, whereby the intended suspension bushing 10 is obtained as indicated in FIGS. 1-5. More specifically, the outer sleeve 38 is provided with a thin-walled sealing rubber layer 40, which is secured by vulcanization to the substantially entire area of the inner circumferential surface of the outer sleeve 38, as shown in FIG. 10. The outer sleeve 38 is put onto the inner assembly 18, and then radially inwardly compressed so that the outer sleeve 38 is fitted on the metallic sleeve 14. At the same time, the axially opposite end portions of the outer sleeve 38 is roll-caulked against the corresponding axial end faces of the metallic sleeve 14. Thus, the outer sleeve 38 is assembled with the inner assembly 18 including the inner and metallic sleeves 12, 14 and the elastic body 16.

With the outer sleeve 38 fitted on the inner assembly 18, the openings of the first, second and third pockets 20, 24, 26 formed in the elastic body 16 are fluid-tightly closed by the outer sleeve 38 via the sealing rubber layer 40, whereby three fluid-tightly enclosed spaces are formed. The above-indicated stopper portion 31 extending from the inner sleeve 12 is accommodated within each of the enclosed spaces, such that the arcuate radial end face of the stopper portion 31 is opposed to the inner circumferential surface of the outer sleeve 38 (precisely, sealing rubber layer 40) with a suitable spacing therebetween. The stopper portion 31 functions as a stop for limiting an amount of relative displacement of the inner and outer sleeves 12, 38 in the radial directions thereof, by abutting contact of the stopper portion 31 with the outer sleeve 38.

The thus fluid-tightly enclosed pockets 20, 24, 26 are filled with a suitable non-compressible fluid, whereby a main fluid chamber 42, a first auxiliary fluid chamber 44, and a second auxiliary fluid chamber 46 are formed corresponding to the first, second and third pockets 20, 24, 26, respectively.

A non-compressible fluid such as water, alkylene glycol, polyalkylene glycol or silicone oil may be used for filling the above-indicated three fluid chambers 42, 44, 46. The filling of the chambers 42, 44, 46 may be effectively conducted by mounting the outer sleeve 38 on the inner assembly 18 within a mass of the selected non-compressible fluid.

Figure 1:
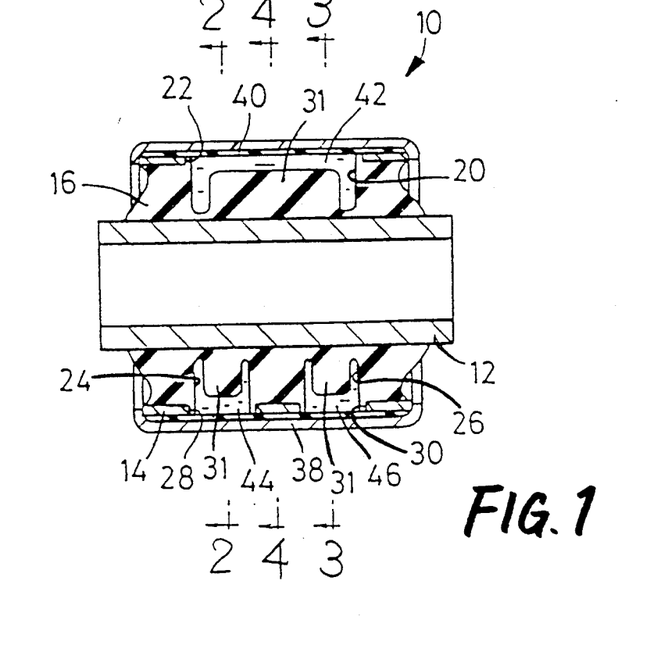
FIG. 1 is an elevational view in axial cross section of one embodiment of a fluid-filled cylindrical elastic connector, in the form of a suspension bushing used for a motor vehicle.
Figure 2:
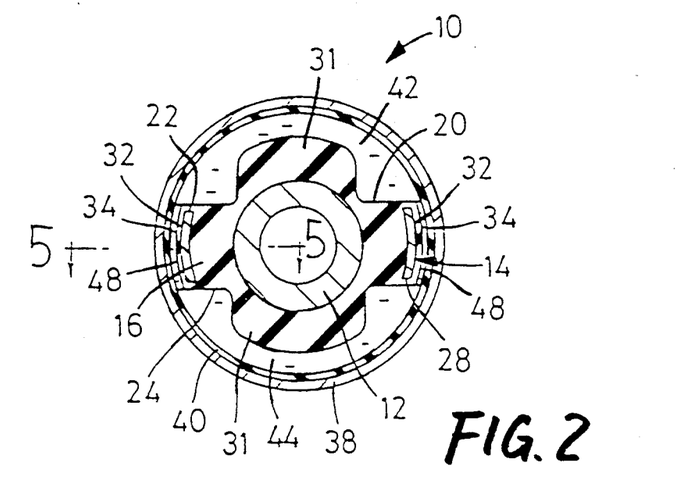
FIGS. 2, 3 and 4 are elevational views in transverse cross section of the suspension bushing of FIG. 1, taken along lines 2—2, 3—3 and 4—4 of FIG. 1, respectively.
Figure 3:
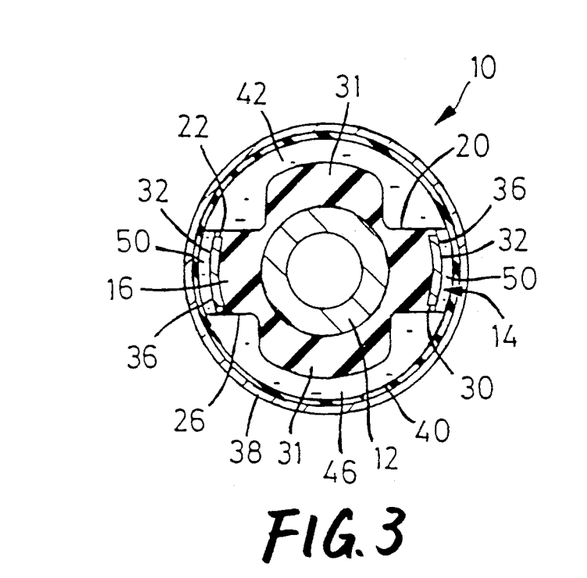
Figure 4:
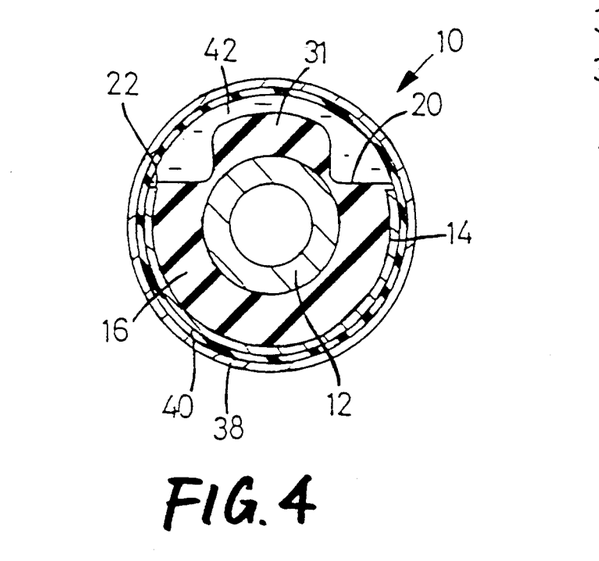
Figure 5:
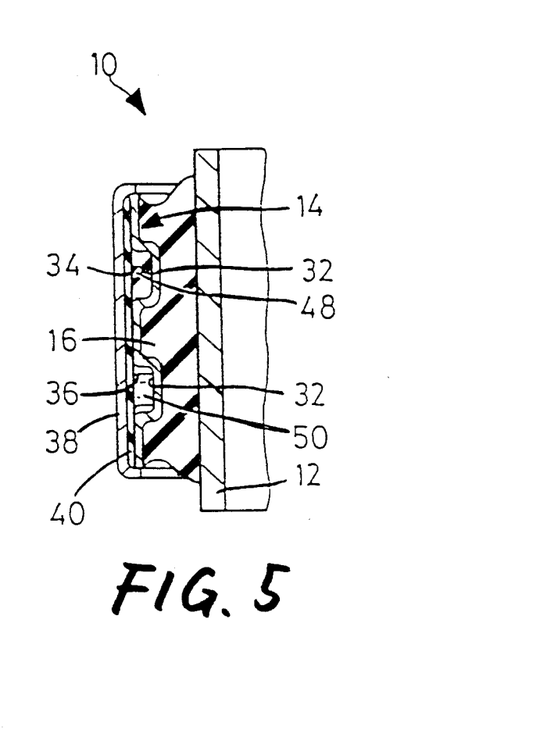
FIG. 5 is an elevational view in axial cross section of the suspension bushing of FIG. 1, taken along line 5—5 of FIG. 2.

With the outer sleeve 38 mounted on the inner assembly 18 of FIG. 6, the openings of the first and second arcuate grooves 34, 36 formed in the metallic sleeve 14 are fluid-tightly closed by the outer sleeve 38. Consequently, a pair of first orifice passages 48 corresponding to the first arcuate grooves 34 are defined by the elastic body 16 and the outer sleeve 38, while a pair of second orifice passages 50 corresponding to the second arcuate grooves 36 are deined by the elastic body 16, outer sleeve 38 and metallic sleeve 14, as shown in FIG. 5. The first orifice passages 48 communicate with the main chamber 42 and the first auxiliary fluid chamber 44, permitting fluid flows between these two chambers 42, 44, while the second orifice passages 50 communicate with the main chamber 42 and the second auxiliary fluid chamber 46, permitting fluid flows between these two chambers 42, 46.

In the thus constructed suspension bushing 10, when a vibrational load is applied between the inner and outer sleeves 12, 38, in a radial direction in which the main fluid chamber 42 is opposed to the first and second auxiliary fluid chambers 44, 46, relative pressure changes occur between the main fluid chamber 42 and the first auxiliary fluid chamber 44 and between the main fluid chamber 42 and the second auxiliary fluid chamber 46, in response to periodic volumetric changes of these chambers 42, 44, 46 due to elastic deformation of the elastic body 16. As a result, the non-compressible fluid is forced to flow between the chambers 42, 44 and between the chambers 42, 46, through the first orifice passages 48 and the second orifice passages 50, respectively.

Since the first orifice passages 48 have a relatively small cross sectional area as described above, the resonance frequency of the fluid masses which flow through the first orifice passages 48 may be set or tuned to relatively low frequencies of vibrations. Accordingly, the present suspension bushing 10 provides a high damping effect with respect to low-frequency vibrations around 20 Hz, such as front or vertical shakes or lateral shakes of the suspension system, based on the resonance of the fluid masses flowing through the orifice passages 48. On the other hand, since the second orifice passages 50 have a relatively large cross sectional area as described above, the resonance frequency of the fluid masses which flow through the second orifice passages 50 may be set or tuned to relatively high frequencies of vibrations. Accordingly, the present suspension bushing 10 exhibits a sufficiently low dynamic spring constant with respect to high-frequency vibrations around 150 Hz, such as booming noises or road-oriented noises, based on the resonance of the fluid masses flowing through the orifice passages 50.

Thus, the suspension bushing 10 constructed as described above is capable of exhibiting excellent damping capability with respect to the low-frequency vibrations, such as front shakes or lateral shakes, based on the resonance of the fluid flowing through the first orifice passages 48. When the bushing 10 is subjected to the high-frequency vibrations, such as booming noises or road-oriented noises, the resonance of the fluid flowing through the second orifice passages 50 sufficiently lowers the dynamic spring constant of the bushing 10. Accordingly, the suspension bushing 10 exhibits a sufficiently lowered dynamic spring constant based on the fluid flows through the second orifice passages 50, with respect to the high-frequency vibrations which cause the first orifice passages 48 to be practically substantially closed and fail to function. Thus, the present suspension bushing 10 is capable of exhibiting excellent vibration isolating capability, without suffering from undesirably increased dynamic spring constant due to the substantial closure of the first orifice passages 48 upon application of the high-frequency vibrations.

In the suspension bushing 10 of the instant embodiment, the amount of relative displacement between the inner and outer sleeves 12, 38 in the radial directions thereof can be limited by abutting contact of the stopper portion 31 extending and accommodated in each fluid chamber 42, 44, 46, with the outer sleeve 38. In this arrangement, the amount of relative displacement between members to be connected by the bushing 10, and the amount of deformation of the elastic body 16 can be effectively limited even when an excessively large vibrational load is applied to the bushing 10.

Referring next to FIGS. 11-15, another embodiment of the suspension bushing of the invention will be described. The same reference numerals as used in FIGS. 1-10 will be used in FIGS. 11-15 to identify the functionally corresponding components, and no redundant description of these components will be given.

The suspension bushing generally indicated at 52 has a rigid stop member in the form of a generally annular stopper member 53 made of metal, such that the stopper member 53 is fitted on and secured to the inner sleeve 12 at its portion corresponding to the second pocket 24 as viewed in the axial direction of the sleeve 12. The stopper member 53 has two diametrically opposite protrusions 54, 54, which arc formed so as to extend radially outwardly from the inner member 12 by a predetermined distance. These protrusions 54, 54 having a predetermined radial dimension project into the main fluid chamber 42 and the first auxiliary fluid chamber 44, respectively, so that the radial end faces of the protrusions 54, 54 are opposed to the inner circumferential surface of the outer sleeve 38 with a suitable spacing therebetween. The radial end faces of the protrusions 54, 54 of the stopper member 53 are covered by respective rubber layers 62 which are formed as integral parts of elastic body 16.

Figure 12:
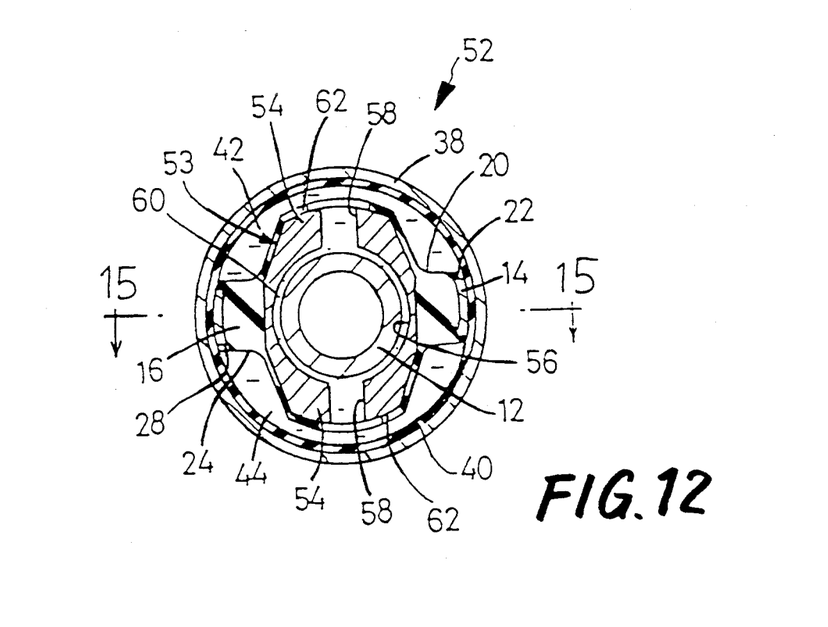
FIGS. 12-14 are elevational views in transverse cross section of the suspension bushing of FIG. 11, taken along lines 12—12, ,13—13 and 14—14 of FIG. 11.

The stopper member 53 has a circumferential groove 56 formed in its inner circumferential surface, as shown in FIG. 12. The stopper member 53 further has a pair of communication holes 58, 58 formed through the respective protrusions 54, 54, extending in the radial direction thereof from the circumferential groove 56 to the radial end faces of the protrusions 54, 54. With the stopper member 53 attached to the inner sleeve 12, the circumferential groove 56 is closed by the outer circumferential surface of inner sleeve 12, whereby a first orifice passage 60 consisting of the circumferential groove 56 and the communication holes 58, 58 is defined by the inner sleeve 12 and the stopper member 53, such that the orifice passage 60 is open in the radial end faces of the protrusions 54, and such that the orifice passage 60 is held in communication with the main fluid chamber 42 and the first auxiliary fluid chamber 44.

Figure 13:
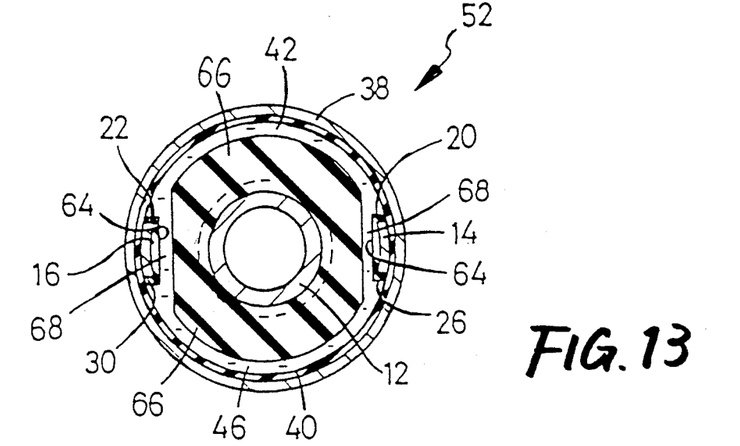
Figure 14:
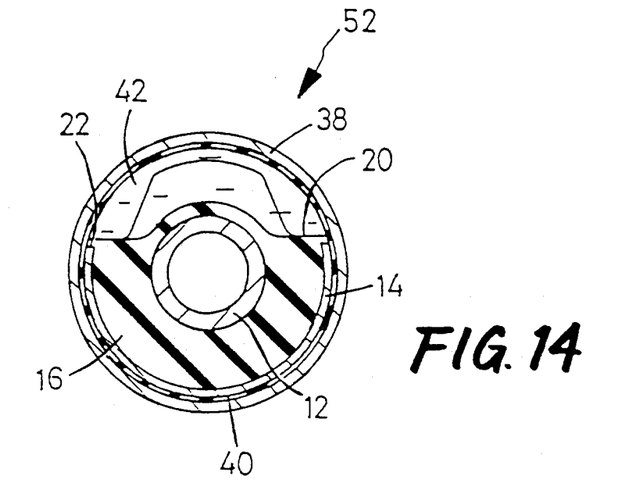
Figure 15:
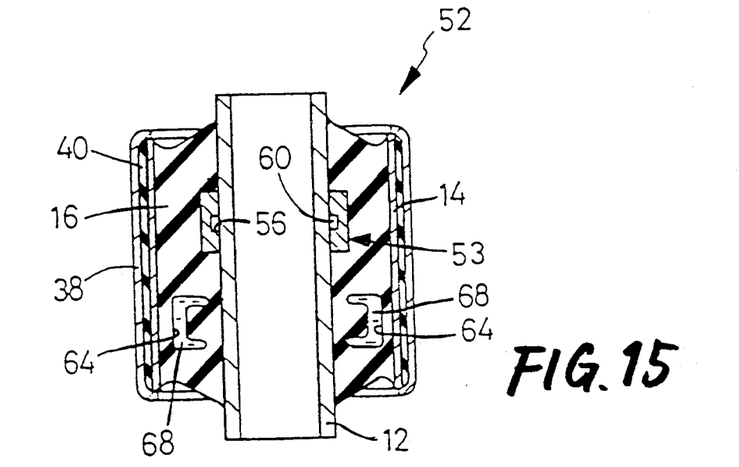
FIG. 15 is an elevational view in axial cross section of the suspension bushing of FIG. 11, taken along line 15—15 of FIG. 12.

In the suspension bushing 52 of the present embodiment, the elastic body 16 has a pair of parallel holes 64, 64 formed through respective portions thereof which are diametrically opposed to each other in the diametric direction perpendicular to the direction in which the first and third pockets 20, 26 are opposed to each other. As shown in FIG. 13, these holes 64, 64 maintain communication between the first pocket 20 which gives the main fluid chamber 42, and the third pocket 26 which gives the second auxiliary fluid chamber 46. Thus, the two holes 64, 64 provide a pair of second orifice passages 68, 68 as shown in FIGS. 13 and 15, for fluid communication between the main fluid chamber 42 and the second auxiliary chamber 46. These second orifice passages 68 have a larger cross sectional area than the first orifice passage 60 between the main fluid chamber 42 and the first auxiliary fluid chamber 44. The elastic body 16 has two integrally formed protruding portions 66, 66 which protrude into the first and third pockets 20, 26, respectively. These two protruding portions 66 are opposed to each other in the direction parallel to the two holes 64.

As in the first embodiment, the thus constructed suspension bushing 52 is capable of providing a high damping effect with respect to low-frequency vibrations, based on the resonance of the fluid flowing through the first orifice passage 60, and exhibiting a low dynamic spring constant with respect to high-frequency vibrations, based on the resonance of the fluid flowing through the second orifice passages 68.

While the present invention has been described in its presently preferred embodiments, for illustrative purpose only, it is to be understood that the invention is by no means limited to the details of the illustrated embodiments, and the invention may be otherwise embodied.

The specific structures of the orifice passages 48, 50, 60, 68 are not limited to those as specified in the illustrated embodiments, but may be suitably changed depending upon the required vibration damping and/or isolating capability of the elastic connector. For example, an orifice-defining member may be fitted in the inner circumferential surface of the outer sleeve 38, so as to provide an orifice passage formed at least one turn round the circumference of the cylindrical elastic connector, as disclosed in laid-open publication No. 61-270533 of unexamined Japanese Patent Application.

While the stopper mechanism in the form of the stopper portion 31 and the stopper member 53 are used in the illustrated embodiments, for limiting the amount of relative displacement between the inner and outer sleeves 12, 38, such a stopper mechanism is not essential to the principle of the present invention.

Although the illustrated embodiments are adapted to be used as suspension bushings for a motor vehicle, the concept of the invention may be embodied as cylindrical engine mounts for a motor vehicle, and other cylindrical elastic connectors whose applications are not limited to the motor vehicle.

It is to be understood that the present invention may be embodied with various changes, modifications and improvements, which may be occur to those skilled in the art, without departing from the spirit and scope of the invention defined in the following claims.

What is claimed is:

1. A fluid-filled cylindrical elastic connector for flexibly connecting two members, comprising:
   an inner sleeve attachable to one of the two members to be flexibly connected;
   an outer sleeve attachable to the other of said two members, and disposed radially outwardly of said inner sleeve with a predetermined radial spacing therebetween;
   a generally annular elastic body interposed between said inner and outer sleeves for elastically connecting said inner and outer sleeves;
   means for defining a main fluid chamber formed between said inner and outer sleeves so as to extend over a predetermined circumferential length of said elastic body, said main fluid chamber being filled with a non-compressible fluid;
   means for defining a first and a second auxiliary fluid chamber formed between said inner and outer sleeves, such that said first and second auxiliary fluid chambers are disposed diametrically opposite to said main fluid chamber with respect to said inner sleeve, and such that said first and second auxiliary fluid chambers are spaced from each other by a predetermined distance in an axial direction of said inner sleeve, said first and second auxiliary fluid chambers being filled with said non-compressible fluid, relative pressure changes occurring between said main fluid chamber and said first and second auxiliary fluid chambers when a vibrational load is applied between said inner and outer sleeves;
   means for defining a continuously open first orifice passage having a first cross sectional area and communicating with said main fluid chamber and said first auxiliary fluid chamber, so as to allow restricted fluid flow therebetween;
   means for defining a continuously open second orifice passage having a second cross sectional area which is larger than said first cross sectional area, and communicating with said main fluid chamber and said second auxiliary fluid chamber, so as to allow restricted fluid flow therebetween; and
   an intermediate sleeve disposed between said outer sleeve and said elastic body and secured to said elastic body, said intermediate sleeve having a first, a second, and a third window which are aligned with said main, first and second chambers, respectively;
   wherein said intermediate sleeve has a first pair of recesses corresponding to a first pair of arcuate grooves which are formed in said elastic body and which are closed by said outer sleeve to thereby provide said continuously open first orifice passage, and a second pair of recesses corresponding to a second pair of arcuate grooves which are formed in said elastic body and which are closed by said outer sleeve to thereby provide said continuously open second orifice passage.

2. A fluid-filled cylindrical elastic connector according to claim 1, wherein said elastic body has a first pocket corresponding to said main fluid chamber, and a second and a third pocket corresponding to said first and second auxiliary fluid chambers, said first, second and third pockets being closed by said outer sleeve, whereby said main fluid chamber and said first and second auxiliary fluid chambers are defined by said elastic body and the outer sleeve.

3. A fluid-filled cylindrical elastic connector according to claim 1, further comprising at least one stop accommodated in at least one of said main, first auxiliary, and second auxiliary chambers, for limiting an amount of relative displacement of said inner and outer sleeves in the radial directions thereof.

4. A fluid-filled cylindrical elastic connector according to claim 3, wherein said elastic body has three stopper portions as said at least one stop, said three stopper portions protruding into said main fluid chamber, said first auxiliary fluid chamber and said second auxiliary fluid chamber, respectively.

5. A fluid-filled cylindrical elastic connector for flexibly connecting two members, comprising:
   an inner sleeve attachable to one of the two members to be flexibly connected;
   an outer sleeve attachable to the other of said two members, and disposed radially outwardly of said inner sleeve with a predetermined radial spacing therebetween;
   a generally annular elastic body interposed between said inner and outer sleeves for elastically connecting said inner and outer sleeves;
   means for defining a main fluid chamber formed between said inner and outer sleeves so as to extend over a predetermined circumferential length of said elastic body, said main fluid chamber being filled with a non-compressible fluid;
   means for defining a first and a second auxiliary fluid chamber formed between said inner and outer sleeves, such that said first and second auxiliary fluid chambers are disposed diametrically opposite to said main fluid chamber with respect to said inner sleeve, and such that said first and second auxiliary fluid chambers are spaced from each other by a predetermined distance in an axial direction of said inner sleeve, said first and second auxiliary fluid chambers being filled with said non-compressible fluid, relative pressure changes occurring between said main fluid chamber and said first and second auxiliary fluid chambers when a vibrational load is applied between said inner and outer sleeves;
   means for defining a continuously open first orifice passage having a first cross sectional area and communicating with said main fluid chamber and said first auxiliary fluid chamber, so as to allow restricted fluid flow therebetween;
   means for defining a continuously open second orifice passage having a second cross sectional area which is larger than said first cross sectional area, and communicating with said main fluid chamber and said second auxiliary fluid chamber, so as to allow restricted fluid flow therebetween; and at least one stop accommodated in at least one of said main, first auxiliary, and second auxiliary chambers, for limiting an amount of relative displacement of said inner and outer sleeves in the radial directions thereof;

wherein said at least one stop comprises a rigid stop member fitted on said inner sleeve and having two protrusions which protrude into said main fluid chamber and said first auxiliary fluid chamber, said rigid stop member and said inner sleeve defining said continuously open first orifice passage; and wherein said elastic body has a pair of parallel holes formed therethrough so as to communicate with said main fluid chamber and said second auxiliary fluid chamber, thereby serving as said continuously open second orifice passage.

6. A fluid-filled cylindrical elastic connector according to claim 5, wherein said elastic body has a first pocket corresponding to said main fluid chamber, and a second and a third pocket corresponding to said first and second auxiliary fluid chambers, said first, second and third pockets being closed by said outer sleeve, whereby said main fluid chamber and said first and second auxiliary fluid chambers are defined by said elastic body and the outer sleeve.

7. A fluid-filled cylindrical elastic connector according to claim 6, further comprising an intermediate sleeve disposed between said outer sleeve and said elastic body and secured to said elastic body, said intermediate sleeve having a first, a second, and a third window which are aligned with said first, second and third pockets, respectively.

8. A fluid-filled cylindrical elastic connector according to claim 5, wherein said elastic body has three stopper portions as said at least one step, said three stopper portions protruding into said main fluid chamber, said fluid auxiliary fluid chamber and said second auxiliary fluid chamber, respectively.

* * * * *